United States Patent [19]
Cedar

[11] Patent Number: 5,367,649
[45] Date of Patent: Nov. 22, 1994

[54] PROGRAMMABLE CONTROLLER

[75] Inventor: Yoram Cedar, Sunnyvale, Calif.

[73] Assignee: WaferScale Integration, Inc., Fremont, Calif.

[21] Appl. No.: 609,123

[22] Filed: Oct. 31, 1990

Related U.S. Application Data

[63] Continuation of Ser. No. 197,004, May 20, 1988, abandoned.

[51] Int. Cl.⁵ .......................... G06F 9/24; G06F 9/40
[52] U.S. Cl. ............................... 395/375; 364/261.3; 364/938
[58] Field of Search ... 364/200 MS File, 900 MS File; 395/200, 250, 375, 800

[56] References Cited

U.S. PATENT DOCUMENTS

| | | | |
|---|---|---|---|
| 3,629,857 | 12/1971 | Faber | 364/200 |
| 4,138,732 | 2/1979 | Suzuki et al. | 364/900 |
| 4,285,038 | 8/1981 | Suzuki et al. | 364/200 |
| 4,338,675 | 7/1982 | Palmer et al. | 364/748 |
| 4,527,233 | 7/1985 | Ambrosius, III et al. | 364/200 |

OTHER PUBLICATIONS

Advanced Micro Devices, Inc., "the Am2900 family data book", (1978), pp. 1-1 thru 2-113.
Andrew Tanenbaum, "Structured Computer Organization", 1976, Prentice Hall, pp. 70-79.

*Primary Examiner*—David Y. Eng
*Attorney, Agent, or Firm*—Skjerven, Morrill, MacPherson, Franklin & Friel

[57] ABSTRACT

A programmable controller includes an interface circuit for communicating with a host CPU. The interface circuit includes a FIFO memory having a plurality of locations, each location receiving address and data information. The data information can either be an operand or a command. Whether the data information is an operand or a command is determined by one of the bits of the address. If the data information is an operand, it is stored at a location determined by the address. Accordingly, in a single host CPU cycle, the host CPU can write one word to the controller which comprises either a command or data and the address where the data can be stored. Multiple cycles are not required to provide a single instruction or data to the controller. Further, because a FIFO memory is used, a plurality of instructions are loaded into the controller and the controller and the host CPU can operate asynchronously. The controller also includes an EPROM for providing instructions to an internal CPU and a sequencer for providing addresses to the EPROM. The EPROM provides an output word including a bit field containing instructions for the sequencer, a bit field containing instructions for the CPU, and a bit field including instructions which are sent directly to the peripheral device. Accordingly, the controller can perform a plurality of instructions in parallel.

5 Claims, 3 Drawing Sheets

PROGRAMMABLE CONTROLLER

This application is a continuation of application Ser. No. 07/197,004, filed May 20, 1988 now abandoned.

BACKGROUND OF THE INVENTION

This invention relates to programmable controllers and to integrated circuits for interfacing peripheral devices to computers.

There are a number of peripheral interface controller chips known in the art. Such devices typically include a data bus for receiving data or commands from a host CPU, and an address bus for receiving an address from the host CPU. The received data (or command) is placed in an appropriate register selected in response to the received address. The controller then sends appropriate commands or data to the peripheral device in response to the data or command received from the host CPU. Such controllers can control peripheral I/O devices so that the host CPU need not spend time performing peripheral device control tasks.

As peripheral devices become faster, it is necessary to provide controllers capable of great speed and efficiency. Accordingly, it is an object of the present invention to provide a controller capable of performing a number of tasks in parallel to enhance controller speed and efficiency.

SUMMARY

A controller constructed in accordance with my invention controls a peripheral device and facilitates communication of data and commands between the peripheral device and a host CPU. The controller includes a CPU, a memory for providing instructions to the CPU, and a sequencer for providing addresses to the memory. The memory output words include three fields: a first field for providing instructions and branch addresses to the sequencer, a second field for providing instructions to the CPU, and a third field which provides data or instructions to the peripheral device. The controller also includes an I/O port for permitting the host CPU to provide data to the peripheral device, and an address counter for permitting the controller to provide sequential addresses to the peripheral device (e.g. to facilitate DMA operations). Thus, the architecture of the controller permits a number of functions to be performed simultaneously, quickly, and efficiently.

The host CPU communicates with the controller asychronously by storing data and instructions in a FIFO memory. In one embodiment, each data word stored in the FIFO memory has two fields: an address field and a command/data field. A first bit within the address field indicates whether the information in the command/data field is a command or data. If the information in the command/data field is a command it is used as a vector branch address by the sequencer. If it is data, it is stored in one of a plurality of registers selected by the address in the address field. Thus, because of the unique FIFO interface circuit, a single word of data loaded into the FIFO memory in one write cycle contains either a command or data. The controller does not need to fetch an additional word of information from the FIFO to determine whether it is a command or data, and if it is data, the controller does not need to fetch an additional word of information to determine where that data is to be stored. Thus, the interface circuit of the present invention is extremely efficient.

My invention is better understood with reference to the detailed description below.

DETAILED DESCRIPTION

Figure 1:
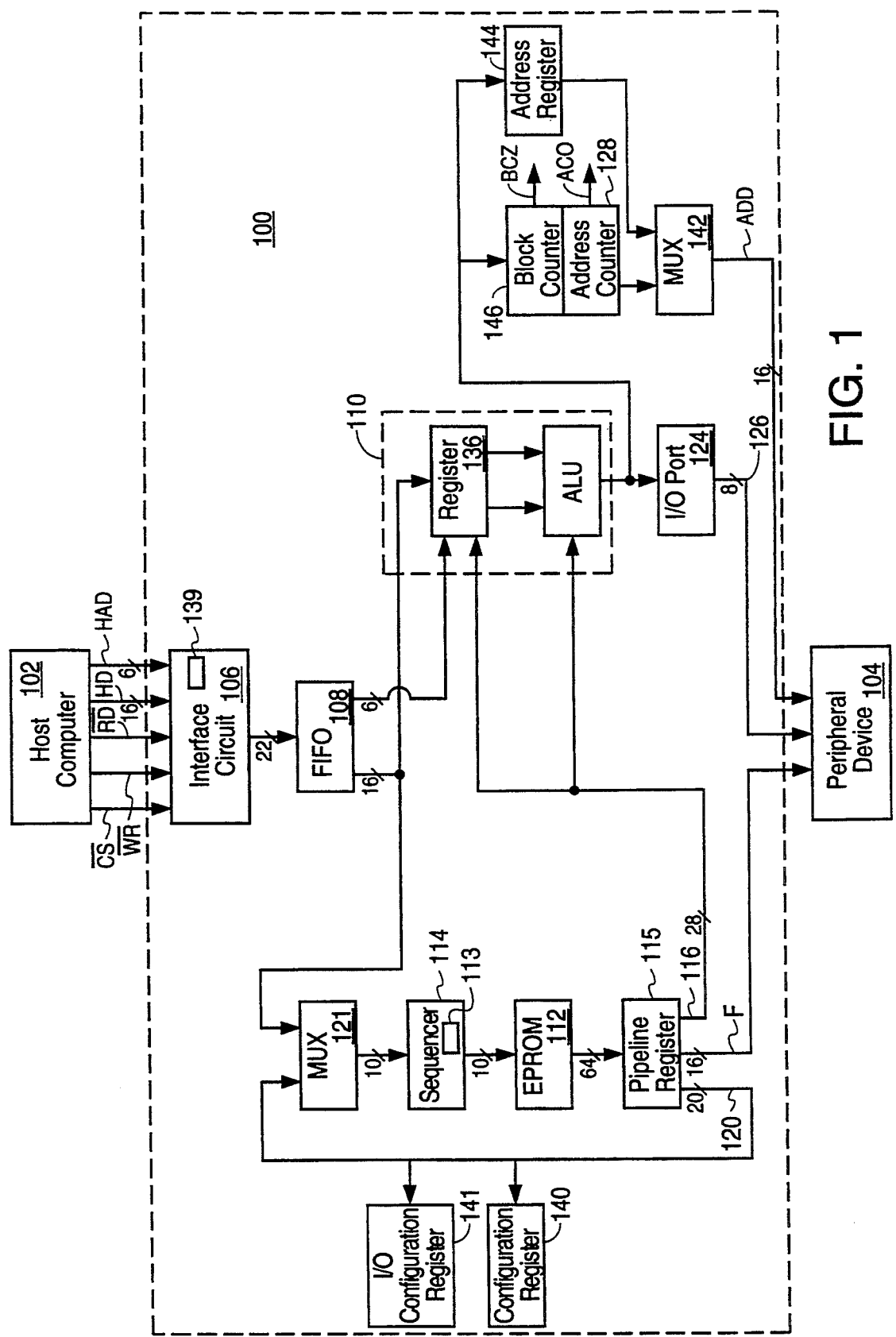
FIG. 1 illustrates a programmable controller 100 for controlling a peripheral device 104.

FIG. 1 is a block diagram of a programmable controller 100 constructed in accordance with my invention. Referring to FIG. 1, controller 100 receives commands and data from a host computer 102, and in response thereto, controls a peripheral device 104. Peripheral device 104 can be any conventional type of I/O device.

The main blocks of controller 100 include a CPU 110, an EPROM 112 for providing instructions to CPU 110, and a sequencer 114 for addressing EPROM 112.

During operation, an instruction counter 113 within sequencer 114 provides sequential addresses to EPROM 112, which provides a 64 bit output word in response thereto. A first group of bits from the output word are communicated as an instruction or data to CPU 110 via a pipeline register 115, and a 28 bit bus 116. A second group of bits from the EPROM output word are communicated back to sequencer 114 via pipeline register 115, a 20 bit bus 120, and a multiplexer 121. The data on bus 120 can include a branch address to be loaded into sequencer 114 under appropriate conditions (described below) or can comprise other instructions to be executed by sequencer 114 (e.g. a call instruction, a conditional branch, etc., as discussed below).

A third group of bits is communicated from EPROM 112 to a 16 bit output bus F via pipeline register 115. Output bus F can be used for providing user programmable instructions to peripheral device 104. (Various lines of bus F can also be coupled to provide user-programmable signals to host processor 102.)

In one embodiment, EPROM 112 is programmed using a circuit described in copending U.S. patent application Ser. No. 07/197,008, filed on May 20, 1988 by De Hieu Nguyen, entitled "Structure for Programming an EPROM", now abandoned, incorporated herein by reference.

Also illustrated in FIG. 1 is an I/O port 124 coupled to an 8-bit I/O bus 126 which facilitates exchange of data and commands between CPU 110 and peripheral device 104.

Data and instructions are exchanged between host CPU 102 and controller 100 via a 16 bit data bus HD, a 6 bit address bus HAD, and a host interface circuit 106. Host interface circuit 106 also receives a chip select signal $\overline{CS}$, a write enable signal $\overline{WR}$, and a read enable signal $\overline{RD}$ to control data flow between microprocessor 102 and controller 100.

Host interface circuit 106 loads the signals from buses HD and HAD into 8 word by 22 bit FIFO memory 108. In response to an instruction from EPROM 112, a word stored in FIFO memory 108 can be read by controller 100.

Five of the six bits of data originating from bus HAD which are read from FIFO memory 108 are used to select one of 32 registers 136 within CPU 110 where data originating from bus HD is to be stored. The sixth bit from bus HAD read from FIFO memory 108 determines whether the sixteen 16 bits of data received from bus HD are a command or are data. If the sixth bit (HAD-B) is a zero, the data from FIFO memory 108 originating from bus HD is stored in the register within registers 136 selected by the 5 lowest bits of bus HAD for future use as an operand. If bit HAD-5 is a one, the sixteen bits of data which originated from bus HD are communicated to sequencer 114 and are used as a branch address. Thus, host CPU 102 can command sequencer 114 to branch to an address where desired instructions are stored.

Host processor 102 can also read various registers within controller 100 via interface circuit 106. Table I below lists the various registers that can be read from or written to by host process 102.

TABLE I

| $\overline{CS}$ | $\overline{RD}$ | $\overline{WR}$ | HAD-5 | HAD-0 to HAD-4 | HD | Operation |
|---|---|---|---|---|---|---|
| 0 | 1 | 0 | 0 | Register Address | Data | Write data to FIFO 108 |
| 0 | 1 | 0 | 1 | Don't care | Command | Write command to FIFO 108. Data originating from bus HD serves as branch address. |
| 0 | 0 | 1 | 0 | 00000 | | Read contents of I/O Port 124 (Contents of port 124 loaded onto bus HD) |
| 0 | 0 | 1 | 0 | 00100 | | Reset controller 100 |
| 0 | 0 | 1 | 0 | 00010 | | Read the contents of instruction counter 113 within sequencer 114. |
| 0 | 0 | 1 | 0 | 00001 | | Read Status register 139 (within interface circuit 106) |

The status register 139 comprises a FIFO input ready signal FIIR (i.e. a flag indicating that FIFO memory 108 is ready to accept data) and bits HAD-5 of each of the 8 words in FIFO memory 108.

Address Counter and Block Counter

Programmable controller 100 includes an address counter 128 which can be loaded by CPU 110, and enabled or disabled by writing appropriate data to the ACEN bit of a configuration register 140. Counter 128 can be configured to operate as either a 16 bit counter or a 22 bit counter, depending on the state of the AC22 bit (bit 9) of an I/O configuration register 141. (Configuration register 140 and I/O configuration register 141 are loaded with data from EPROM 112 in a manner described below.) When enabled, address counter 128 increments every instruction cycle of CPU 110. When counter 128 is a 16 bit counter, the contents of address counter 128 can be presented on a 16 bit address bus ADD via multiplexer 142. When address counter 128 is in the 22 bit mode, only the higher 16 bits of counter 128 are presented on bus ADD, while the lower 6 bits can be used to drive bus HAD. (Multiplexer 142 drives bus ADD with either the contents of address counter 128 or an address register 144, depending on the state of the ASEL bit of configuration register 140.)

Bus ADD is typically connected to peripheral device 104. Address counter 128 can be used to provide sequential addresses to peripheral device 104, e.g. to perform DMA operations. Address counter 128 can also serve as an event counter. When the contents of address counter 128 are all ones, a flag signal ACO is generated.

Controller 100 also includes a block counter 146 which can be loaded with data by CPU 110 or read by CPU 110. Block counter 146 is a 16 bit down counter which decrements every instruction cycle of CPU 110 when enabled by bit BCEN of configuration register 140. Block counter 146 generates a flag BCZ when its contents reach zero. Block counter 146 can be used in DMA operations, e.g. by causing controller 100 to branch to a routine which disables address counter 128 after address counter 128 generates a predetermined number of addresses.

Program Control

Figure 2:
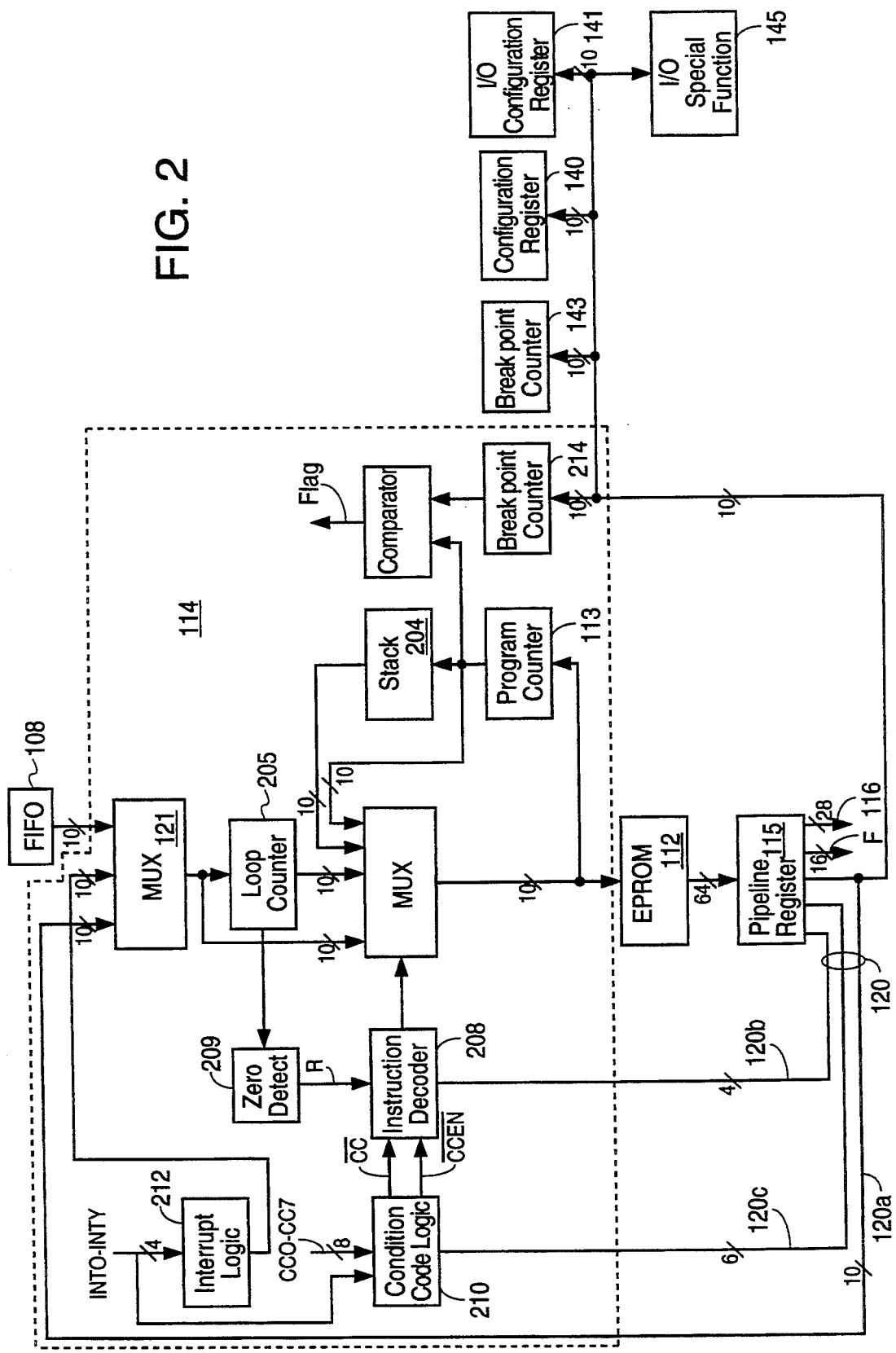
FIG. 2 illustrates a sequencer used to address an EPROM in the controller of FIG. 1.

As mentioned above, sequencer 114 includes program counter 113 for providing sequential addresses to EPROM 112. Also provided in sequencer 114 is a 15 level stack 204 (FIG. 2) for storing return addresses for subroutine calls or interrupt service routines. When stack 204 is one level away from being full, an interrupt, if enabled, will occur.

Sequencer 114 also includes a loop counter 205, i.e. a 10-bit programmable counter which decrements after each instruction. Loop counter 205 can be used to execute loops, e.g. to execute a set of instructions a predetermined number of times. Loop counter 205 can also be used as a source of addresses to be presented to EPROM 112.

The functions performed by sequencer 114 are controlled by 20 bit bus 120, which is driven by pipeline register 115. Bus 120 is divided into a group of 10 data lines 120a, 4 instruction lines 120b, and 6 condition code select lines 120c. Instructions on instruction lines 120b are decoded by instruction decoder 208, which causes sequencer 114 to execute one of 16 instructions. The instruction set for sequencer 114 is similar to the instruction set of device number Am2910, manufactured by Advanced Micro Devices, and described at pages 2-88 to 2-100 of "The Am2900 Family Data Book" published by Advanced Micro Devices, Inc in 1978, incorporated herein by reference.

The instructions executed by sequencer 114 include conditional jump and conditional call statements which are executed in response to condition signal $\overline{CC}$ and condition enable signal $\overline{CCEN}$. These signals are used by instruction decoder 208 in a manner discussed in the above mentioned Am2900 Family Data Book. Signals $\overline{CC}$ and $\overline{CCEN}$ are generated by condition code logic 210 in response to a set of flag signals, interrupt signals, and condition code signals. The interrupt signals are provided on lines INT0 to INT4 from sources external to controller 100, e.g. host CPU 102 or peripheral device 104. The condition code signals are provided on condition code leads CC0 to CC7, also by sources external to controller 100. Condition code logic 210 also receives other flags generated by controller 100 (discussed below), as well as the signals on condition code select lines 120c from EPROM 112. The signals on lines 120c are used to select a condition code signal, interrupt signal, or flag which is in turn used to generate signals $\overline{CC}$ and $\overline{CCEN}$. Signals $\overline{CC}$ and $\overline{CCEN}$ are tested by instruction decoder 208 for conditional branching.

The flag signals received by condition code logic 210 generated by controller 100 are as follows:

| Flag | Interpretation |
|------|----------------|
| ACO | Address counter 128 is all ones |
| STKF | Stack 204 full |
| FIIR | FIFO input ready (i.e. space available in FIFO 108) |
| DOR | I/O port 124 has been read |
| INT | An interrupt has occurred |
| BCZ | Block counter 146 all zeros |
| FIOR | FIFO 108 has at least one message |
| FICD | FIFO 108 top message is a command |
| S | Most significant bit as a result of last operation of CPU 110 was a 1 |
| O | Most recent operation of CPU 110 caused an overflow |
| Z | Most recent operation of CPU 110 generated a zero |
| CY | Most recent operation of CPU 110 generated a carry signal or a borrow signal |

Sequencer 114 includes a zero detect circuit 209 which generates a signal on a lead R which indicates that the contents of loop counter 205 are zero. Decoder 208 responds to the signal on lead R in a manner described in "The Am2900 Family Data Book".

Sequencer 114 includes a breakpoint register 214 which can be loaded with data from data lines 120a. (Breakpoint register 214 is loaded with data from lines 120a when the value on condition code select lines 120c is a predetermined value not used by condition code logic 210.) When the contents of breakpoint register 214 equals the contents of program counter 113, an interrupt, if enabled, will occur.

As mentioned above, controller 100 includes four interrupt leads INT0 to INT4 for receiving interrupt signals. Leads INT0 to INT4 are coupled as input leads to interrupt logic 212. In addition, other conditions within controller 100 can generate interrupt signals which are received by interrupt logic 212. Each interrupt, when enabled, causes interrupt logic 212 to load a branch address into program counter 113, thereby causing sequencer 114 to branch to a selected address in EPROM 112 as indicated in Table II below.

| Branch Address | Priority | Source |
|----------------|----------|--------|
| 0000 | lowest | External reset low |
| 0008 | | External interrupt signal INT0 |
| 0009 | | External interrupt signal INT1 |
| 000A | | External interrupt signal INT2 |
| 000B | | External interrupt signal INT3 |
| 000C | | Always active unless masked |
| 000D | | FIFO 108 full |
| 000E | | Contents of Breakpoint register 214 equals program counter 113 |
| 000F | highest | Stack 204 full, Address counter 128 all ones, or FIFO 108 input ready. |

During an interrupt, the previous contents of program counter 113 are saved in stack 204. Of importance, the above interrupts can be masked by writing appropriate data to an interrupt mask register 143.

It is noted that controller 100 contains a number of registers, including mask register 143, configuration register 140, I/O configuration register 141, and an I/O special function register 145. These registers are loaded with data from lines 120a in response to predetermined values on lines 120c not used by condition code logic 210. The functions performed by these registers are discussed below.

The data from lines 120a can also be stored in one of registers 136.

CPU 110

Figure 3:
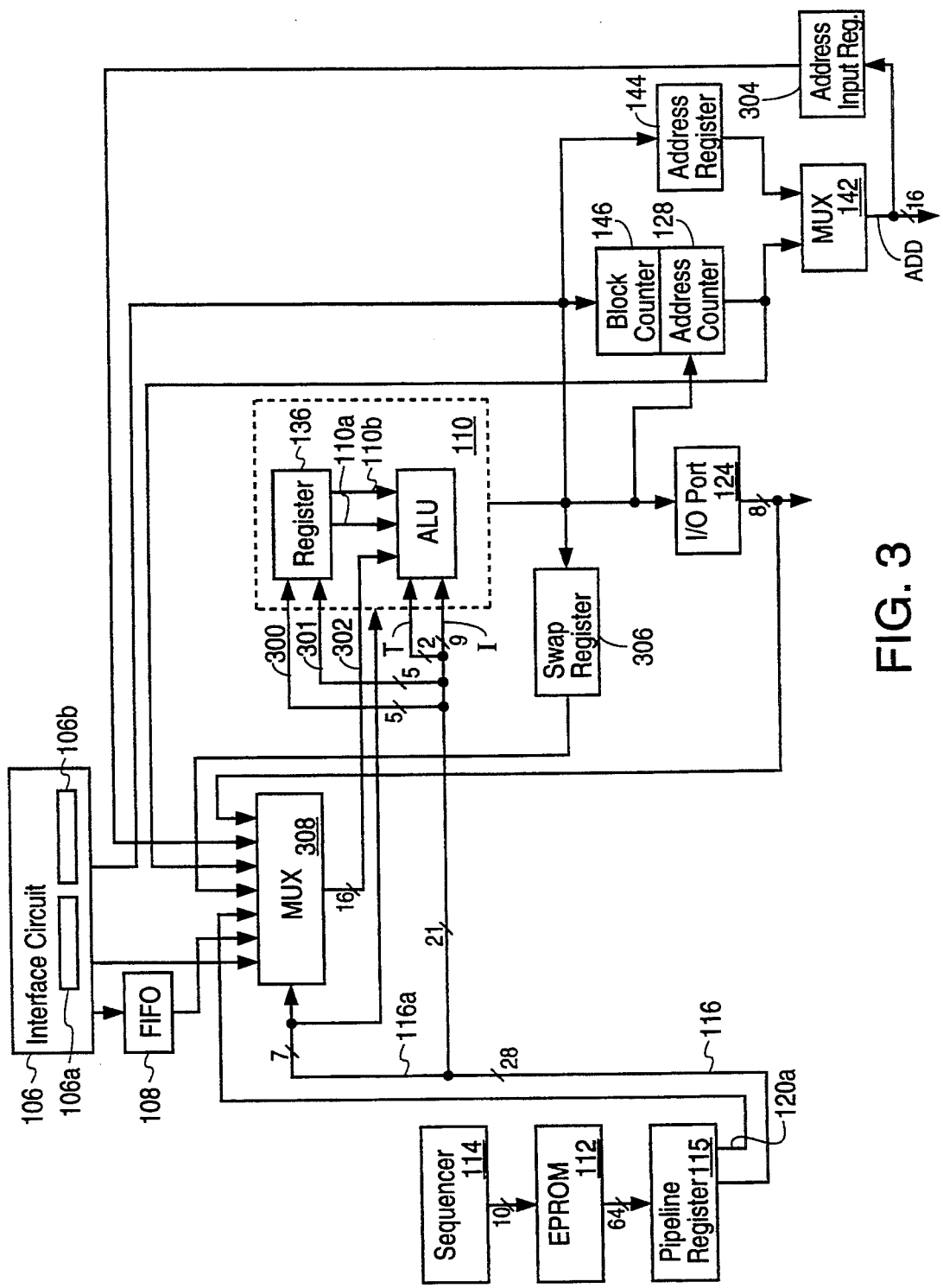
FIG. 3 illustrates data flow paths of operand and resultant data received and provided by CPU 110 of FIG. 1.

As mentioned above, CPU 110 receives 28 signals from EPROM 112 as follows: a five bit A address bus 300 (FIG. 3), a five bit B address bus 301, a 9 bit instruction word I, 2 bits of carry-in data T, and 7 bits 302 which define the source of data supplied to CPU 110 and the destination of output data provided by CPU 110.

The 9 bit instruction word I is interpreted by CPU 110 in the same manner as the instruction bus I of device number Am2901, manufactured by Advanced Micro Devices, Inc., and described at pages 2-2 to 2-25 of the above-incorporated "Am2900 Family Data Book". The structure of CPU 110 is similar to that of the Am2901, except that CPU 110 is a 16 bit device, whereas the Am2901 is a 4 bit device.

The five bit A address bus 300 and B address bus 301 each select a register within registers 136 as a source of operand data on an A operand input bus 110a and a B operand input bus 110b. The data on the A operand input bus 110a and B operand input bus 110b is used in the same manner as the A and B data buses described in the "Am2900 Family Data Book".

CPU 110 includes a D input bus 302 (which functions in the same manner as the Am2901 D bus) which can receive input data from a multiplexer 308. Multiplexer 308 can provide data from the following sources:

1. I/O port 124;
2. An address input register 304;
3. The high and low order bits of address counter 128;
4. A data input register 106a;
5. A swap register 306;
6. FIFO register 108; and
7. Lines 120a from EPROM 112.

The output data from CPU 110 can be stored in any of the following destinations:

1. I/O port 124;
2. Address register 144;
3. The low and high order bits of address counter 128;
4. Block Counter 146; and
5. A data output register 106b.

Of importance, the source of operand data for D input bus 302 and the destination of output data is selected by seven output lines 116a which are part of EPROM output lines 116.

Address input register 304 is coupled to 16 bit bus ADD. When the output drivers which are used by controller 100 to drive bus ADD are disabled (e.g. by writing a zero to the ADOE bit of configuration register 140) bus ADD can be used as an address input bus, and data from bus ADD is clocked into address input register 304 each instruction cycle. Address input register 304 can be used as D operand data by CPU 110 as described above.

Also listed as a source of operand data is a data input register 106a within interface circuit 106. When line $\overline{CS}$ is tied high, FIFO 108 is disabled, and when data is written via 16 bit bus HD to interface circuit 106, it is stored in data input register 106a instead of FIFO memory 108.

Swap register 306 receives output data from CPU 110 every instruction cycle (and is thus always enabled as an output data destination) and swaps the upper and lower order bytes. Swap register 306 can be selected as a source of D operand data.

Data output register 106b is part of interface circuit 106b. Data from output register 106b is provided on leads HD by interface circuit 106 when signal $\overline{CS}$ is high and signal $\overline{RD}$ is low.

I/O PORT 124

I/O port 124 can serve as a general purpose input port or a general purpose output port, depending on the data in an I/O configuration register 141, and an I/O special function register 145. I/O configuration register 141 governs whether the individual pins of I/O port 124 are input pins or output pins.

Pins 0 to 7 of port 124 are also controlled by special function register 145 as follows:

| I/O Pin | Special Function Register 145 | As input pin | As output pin |
|---------|---|---|---|
| I07 | 0 | Simple input | Simple output |
|     | 1 | Simple input | Signal FIIR (FIFO input ready) |
| I06 | 1 | Simple input | Simple output |
|     | 0 | AOE (output enable for bus ADD) | Not Allowed |
| I05 | 1 | Simple input | Simple output |
|     | 0 | AOE (output enable for bus HAD) | Not Allowed |
| I04 | 1 | Simple input | Simple output |
|     | 0 | DOE (output enable for bus HD) | Not Allowed |
| I03 | 0 | Simple input | Simple output |
|     | 1 | Q0 Shift register serial input | Q15 Serial Output |
| I02 | 0 | Simple input | Simple output |
|     | 1 | Q15 Serial input | Q0 Serial Output |
| I01 | 1 | Simple input | Simple output |
|     | 0 | ACEN | Not Allowed |
| I00 | 1 | Simple input | Simple output |
|     | 0 | BCEN | Reserved |

Bits ADOE, DOE, ACEN and BCEN are also control bits within configuration register 140. However, when bit 6 of special function register 145 is a zero, I/O port 124 bit 6 controls the output enable for bus ADD. Similar, bits 0, 1, 4 and 5 can be programmed to override corresponding bits in register 140.

Bits 3 and 2 can be programmed as the Q shift register input/out leads. The Q shift register (not shown) is part CPU 110, and performs the same function as a corresponding Q shift register in the Am2901.

Configuration Register 140

Controller 100 includes a 10 bit configuration register 140, the contents of which are as follows:

| BIT | NAME | FUNCTION |
|---|---|---|
| 0 | ACEN | enables or disables address counter 128 |
| 1 | BCEN | enables or disables block counter 146 |
| 2 | DOE | sets lines HD as controller output lines |
| 3 | ADOE | sets lines HAD as output lines |
| 4 | AOE | Sets lines ADD as output lines |
| 5,6 | DSEL0,DSEL1 | Gives source of data when RD is asserted by host as follows: |
|  | 00 | None |
|  | 01 | Status register 139 |
|  | 10 | Microprocessor data output register 106b |
|  | 11 | Program Counter 113 |

| BIT | NAME | FUNCTION |
|---|---|---|
| 7 | DIREN | Causes data from bus HD to go to address register 106a |
| 8 | AIREN | Causes data from HD bus to go to address register 114 |
| 9 | ASEL | Causes lines ADD to provide contents of address counter 138. Otherwise contents of address register 144 are provided on bus ADD |

I/O Configuration Register 141

The I/O configuration register is a 10 bit register. Bits 0 to 7 determine whether corresponding bits of I/O port 128 are input leads or output leads. Bit 9 is not assigned. Bit 10 is signal AC22, which determines whether address counter 128 is a 16 or 22 bit counter.

Special Function Register 145

The special function register bits are as follows:

| Bit | | |
|---|---|---|
| 0 | INTR | Enables/disables all interrupts. When interrupts are disabled, they can be tested by condition code logic 210. |
| 1 | Not Available | |
| 2 | BCENI | When BCENI is set, the block counter enable signal BCEN is connected to I/O port 124 pin 0. Otherwise, BCEN signal is generated by control register 140. |
| 3 | ACEBI | When ACEBI is set, address counter 128 enable bit ACEN is connected to pin 1 of I/O port 124. Otherwise, ACEN Bit is generated by control register 140. |
| 4 | SIO EN | When SIO EN is set, pins 2 and 3 of I/O port 124 are connected to ALU Q register least and most significant bits, respectively, so that pins 2 and 3 can serve as serial I/O pins. Otherwise, pins 2 and 3 of I/O port 124 are used as general purpose I/O pins. |
| 5 | DOEI | When set, pin 4 of I/O port 124 serves as the output enable pin for HD bus. |
| 6 | ADOEI | When set, pin 5 of I/O port 124 serves as the output enable for HAD bus. |
| 7 | AOEI | When set, I/O port 124 bit 6 serves as the output enable for ADD bus. |
| 8 | FIFOIR | When set, FIFO input ready signal appears on pin 7 of I/O port 124. |
| 9 | FIRST | FIFO reset bit. |

While the invention has been described with regard to specific embodiments, those skilled in the art will appreciate that changes can be made in form and detail without departing from the spirit and scope of the invention. For example, controller 110 can be used as a standalone controller which does not receive instructions from host processor 102. Accordingly, all such changes come within the present invention.

I claim:

1. An integrated circuit peripheral controller for controlling a peripheral device, comprising:
    a memory for storing instruction, at least one of said instructions comprising a first field, a second field and a third field;
    a sequencer for providing in an instruction cycle an address to said memory means and for receiving said first field of an instruction corresponding to said address, said sequencer using said first field to form a branch address to be used in a subsequent instruction cycles;

a CPU receiving said second field of said instruction for executing a command encoded in said second field;

a data memory address counter coupled to said CPU for providing sequential date memory addresses for performing a direct memory access operation;

an input/output port, coupled to said peripheral device;

an in/put port, coupled to said CPu, configurable for (i) inputting a data word from said peripheral device, (ii) outputting a data word to said peripheral device, and (iii) providing in a data word predetermined control signals to said peripheral device;

an output control port for communicating, under said CPU's control, said third field of said instruction as output signals to control said peripheral devide, a FIFO memory for receiving data words from a host processor;

means for receiving said data words from said FIFO memory, and for providing said data words as operand data to said CPU, each of said data words received into said FIFO memory contains first and second fields, at least one bit of said first field determining whether said second field contains an address to an instruction word or contains a data word, means for providing said second field to said sequencer when said second field contains as address to an instruction word;

a plurality of registers; and means for selecting one of said registers according to a predetermined bit pattern in said first field, and for storing said second field in said selected register when said second field contains data.

2. Circuit of claim 1 wherein said memory comprises an eraseable programmable read only memory.

3. An integrated circuit controller for controlling a peripheral device, said integrated controller being coupled to a host processor, comprising:

a central processing unit including a register file having a plurality of registers for storing operand data;

an instruction memory for storing a plurality of instructions executable by said central processing unit;

a sequencer coupled to said instruction memory for providing an address for accessing an instruction in said instruction memory;

a FIFO memory coupled to said host processor, said central processing unit and said register file, said FIFO memory receiving a word from said host processor to provide alternatively said word to said register file and said instruction memory, said word having at least a first field and a second field; and means coupled to said FIFO memory and receiving said first field from said FIFO memory for determining, in accordance with said first field, whether said second field encodes a branch address in said instruction memory for an instruction executable by said central processing unit or contains operand data, for sending said said branch address to said sequencer, if said second field encodes said branch address, and for storing said operand data in one of said registers, in accordance with the bit pattern in said first field, if said second field contains operand data.

4. An integrated circuit peripheral controller for controlling a peripheral device, comprising:

a FIFO memory having a plurality of FIFO input leads for receiving words of data from an external source and a plurality of FIFO output leads for providing a FIFO output word;

an instruction memory, having an instruction address bus, for storing instructions and providing a selected one of said instructions on a plurality of memory output leads in response to an instruction address provided on said instruction address bus, wherein said instruction memory simultaneously provides as output signals on said memory output leads a feedback instruction address, a CPU command and peripheral control signals, wherein said feedback instruction address, said CPU command, and said peripheral control signals are mutually exclusive fields of said selected one of said instructions;

means for providing a next instruction address to said instruction memory on said instruction address bus, said means for providing a next instruction address including an instruction address register containing a current instruction address and means for incrementing said current instruction address to form an incremented instruction address, said means for providing a next instruction address receiving as input signals said feedback instruction address and said FIFO output word and providing an output address on said instruction address bus, wherein said output address provided by said means for providing a next instruction address on said address bus is a selected one of said incremented instruction address, said feedback instruction address and said FIFO output word;

CPU means coupled to said FIFO output leads and said instruction memory for receiving said CPU command and providing a result in response to said CPU command, said CPU means receiving an operand from said FIFO output leads;

a memory address circuit, controlled by said result of said CPU means, for providing sequential memory addresses for use in a direct memory access by said peripheral device;

an memory address port for output of said sequential memory addresses;

an input/output data port controlled by said result of said CPU means for selectably receiving from said peripheral device a data word and providing to said peripheral device a data word; and a peripheral control port, controlled by said result of said CPU means, for providing said peripheral control signals to said peripheral device.

5. A programmable circuit as in claim 4, wherein said CPU means comprises:

a plurality of registers each coupled to said FIFO output leads for storing operands for said CPU means; and means coupled to said FIFO output leads for receiving said output word from said FIFO memory and separating from said output word an operand and an address, wherein said address specifies which one of said registers receives and stores said operand.

* * * * *